Oct. 8, 1957  E. MARX  2,809,243
CONTACT ARRANGEMENT CONSISTING OF AT LEAST ONE
ROLLER ELECTRODE AND A COUNTERELECTRODE FOR AN
UNINTERRUPTED CONTINUOUS ROLLING MOTION
Filed Feb. 25, 1952  2 Sheets-Sheet 2

Inventor:

United States Patent Office 2,809,243
Patented Oct. 8, 1957

2,809,243

CONTACT ARRANGEMENT CONSISTING OF AT LEAST ONE ROLLER ELECTRODE AND A COUNTERELECTRODE FOR AN UNINTERRUPTED CONTINUOUS ROLLING MOTION

Erwin Marx, Braunschweig, Germany

Application February 25, 1952, Serial No. 273,172

Claims priority, application Switzerland March 6, 1951

16 Claims. (Cl. 200—25)

Based on the recognition that contact arrangements consisting of at least one roller electrode and a counter-electrode, for an uninterrupted rolling motion, enable the construction of converters suitable even for high voltages and currents, it has been suggested already to provide at least one of the roller electrodes of such convertors with contact pieces which are resilient relative to their carrier. If the contact pieces were not resilient, the gas barrier gaps which interrupt the rolling motion and with it the flow of current, and which are necessary for the control of such high voltages and currents, would lead to substantial bumps and shocks in conjunction with the measures required to provide for adequate contact pressure. These bumps and shocks would result in damage to, and finally in the destruction of the contact pieces within a short time.

For current conversion, contact arrangements consisting of at least one roller electrode and a counterelectrode, with uninterrupted, continuous rolling motion, have been suggested, in the construction of which the necessity of providing for adequate contact pressure was taken into consideration. This was effected thereby that one of the shafts carrying the contact rollers and causing their rotation was arranged movably and subjected to the action of springs so that forces directed toward the shaft of the other electrode were generated to produce the necessary contact pressure.

Such an arrangement, however, is unsuitable for solving the engineering problem under discussion. For uninterrupted, continuous rolling motion the space between the contact pieces must be filled with insulating material. At the points where contact and insulating materials adjoin wear results, which is promoted by the entirely different behaviour of the contact and insulating materials as regards hardness, elasticity, expansion, abrasion resistance, electrical behaviour, etc., and which adversely affects the motion of the electrodes to a considerable degree. This wear leads after extremely short periods of operation to bumps, which cause large or small displacements of the contact races and initially disturb and finally prevent the sufficient contact required between the contact races rolling one on the other. The main cause of this surprisingly heavy wear soon beginning at the joints between the contact and insulating materials is the mass of the roller electrode. This mass is of particularly strong effect because it is combined with the high peripheral speeds to be used in such convertors in accordance with the frequency. These very considerable shock energies, in conjunction with said different properties of the materials, make the previous suggestions unsuitable from the practical standpoint.

Based on these findings and reflections it is suggested in accordance with the invention, which relates to converters consisting of at least one roller electrode and a counterelectrode, for uninterrupted, continuous rolling motion and for periodically repeated circuit breaking and circuit closing actions, to construct at least one contact race of at least one electrode as an inherently resilient contact piece, that is, as a bodily deformable and hence non-rigid structure which hugs the counterelectrode, that is, the contact race thereof. Only this construction enables the provision of an elastic contact race of the smallest possible mass, which may be cushioned as a whole against the contact race carrier. It is also possible, of course, to arrange pairs of contact races, which are in rolling contact with each other, in such a manner that they are inherently elastic and cushioned against their respective carriers. In this case the carrier will generally be approximately equal in diameter and thus have equal peripheral speeds at the point of rolling contact. Smallest masses are obtained, e. g., thereby that the elastic contact race is given the shape of a ring. The annular shape may be obtained most simply thereby that the elastic contact race is constructed as a strip of suitably small dimension in the direction of its diameter. This may be effected initially thereby that the strip is formed as a closed integral annular piece. The strip, however, may also consist of sections composed to form a ring. The necessary elastic properties may be provided in the most different ways. Thus the strip may be clamped, e. g., peripherally on one side or peripherally on two sides. An even simpler possibility consists in keeping the strip in a cage, which may consist of several stops, or an integral stop shaped like an annular claw may be provided which embraces the strip. By a suitable dimensioning of the strip any desired elastic counterforce may be provided for, to obtain a contact pressure of the necessary magnitude. If the mass of the strip is to be reduced, however, to such an extent that it no longer has the necessary elastic properties, the strip may be subjected also to the action of additional energy storing means, which do not add to the mass of the strip. Such energy storing means may consist most simply of springs in most different forms, e. g., of rubber springs, particularly of rubber rings.

Neither is it necessary to give an electrode only one elastic contact race. An electrode may be given more than one contact race by the arrangement of at least two strips, e. g., on or at the electrode. These strips may intermesh in the direction of the axis of rotation or may be arranged one beside the other in the same direction. The first possibility may be realized thereby that the strips intermesh, e. g., like fingers. As to the dimensions of the contact races it has been mentioned already that they may be chosen in dependence on the desired degree of elasticity. In many cases it will be desirable, however, to select the cross-section so that it just corresponds to the current to be conducted through the contact piece. The resulting inherent elasticity is generally sufficient to generate the necessary contact pressure; where this is not possible the aforementioned additional energy storing means may be used. Nor must the contact races be made from an integral piece of material. In many cases it is more advantageous to construct the contact races of at least two layers of sheets, the first of which provides for the conduction and passage of current whereas the second layer or sheet provides for the necessary elastic properties. For the first layer, known contact materials such as copper, nickel and silver, for the second layer steel, other metals and metal alloys, or plastics, etc., may be used.

Where the roller electrodes consist, in addition to at least one contact piece constructed as a ring section, of solid insulating materials complementing the contact piece to form a solid roll, the peripheral length of the pieces of insulating material is suitably of the same order of magnitude as the contact pieces. In special cases differences are possible.

The accompanying drawings show embodiments of the invention by way of example.

Figure 6:
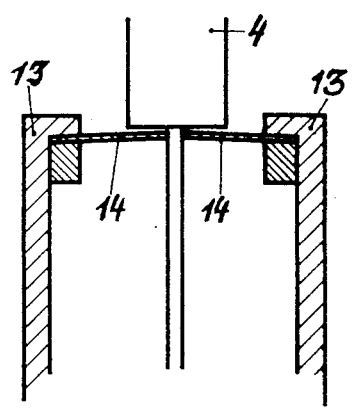
Fig. 6 is a cross-sectional view of a roller electrode having several spring strips.
Figure 7:
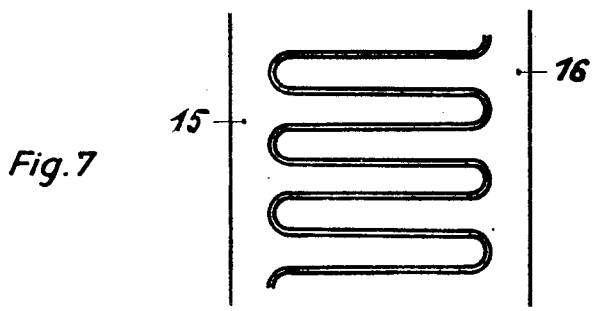
Fig. 7 is a top plan view of a multiple-strip arrangement modified as compared with Fig. 6.
Figure 8:
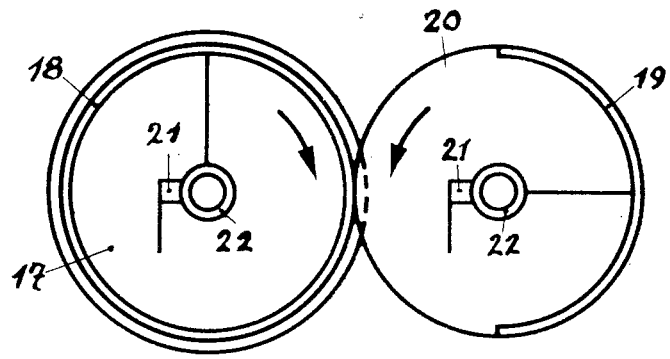
Fig. 8 illustrates the application of roller electrodes as shown in any of Figs. 1 to 7, or of roller electrodes of different construction, in a one-phase, halfwave rectifier.

In Figs. 1 to 7 the roller electrode is illustrated which is constructed in accordance with the invention with an inherently elastic contact race, which hugs the counterelectrode, that is, the contact race thereof. The counterelectrode has been indicated only fragmentarily; only Fig. 8 shows in greater detail a suitable construction of the counterelectrode.

Figure 1:
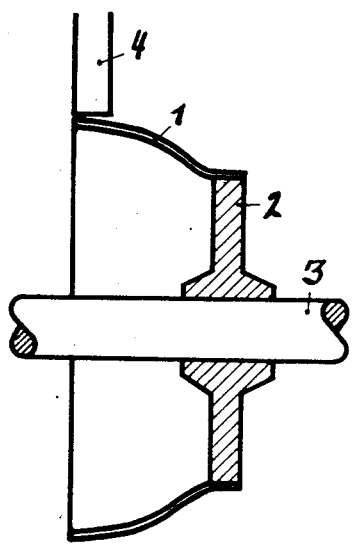
Fig. 1 is a diagrammatic view of a roller electrode having a spring strip clamped on one side.

In the embodiment shown in Fig. 1, the contact race of the roller electrode 1 consists of an integral closed metal ring clamped on one side and fixed on a disk 2, which serves as a contact carrier and rotates with the shaft 3. The elastic contact race 1 may be fixed on the disk 2 by known fixing means, consisting of disks, welding seams, clamping rings, etc., or, without fixing means, e. g., in an annular groove of the disk 2. It is also possible to provide a contact race 1 which is integral with the disk 2. The counterelectrode 4 is indicated as a rotary roller electrode which is either rigid or also inherently elastic.

Figure 2:
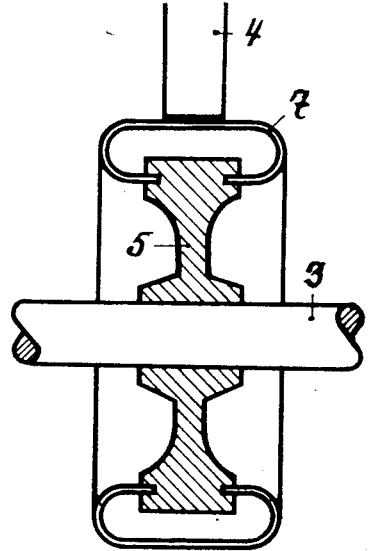
Fig. 2 is a similar longitudinal sectional view showing an embodiment of a roller electrode with a bail-shaped spring strip clamped on both sides.

Fig. 2 shows a modification of the spring strip, represented as a spring ring 7, which is clamped on both sides in the holder 5 and on which the counterelectrode 4 is adapted to roll. In conjunction with the elastic hugging properties of the contact races 1, 7, the necessary contact pressure is achieved thereby that the shafts of the roller electrodes 1 and 4 are correspondingly spaced. This is accomplished, e. g., in that the bearings of at least one of the shafts are movably arranged, in particular so as to be adjustable in the direction towards or away from the other shaft, and can be set in position. This adjustability, however, need not be arbitrary. It is also possible to provide for an automatic adjustment of the shaft spacing, e. g., in automatic dependence of the contact pressure prevailing at any time.

Figure 3:
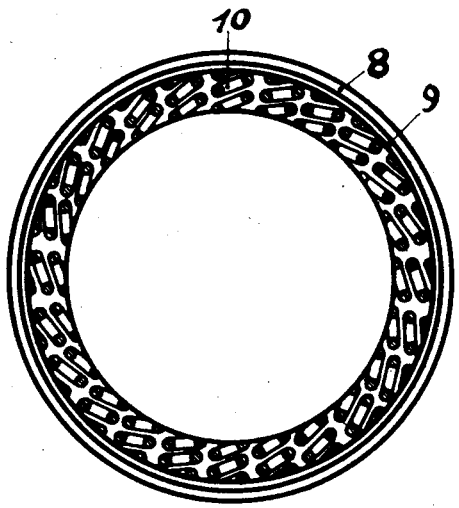
Fig. 3 is a side elevation of a spring strip arrangement with additional energy storing means.
Figure 4:
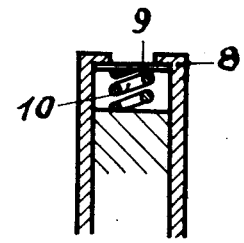
Fig. 4 is a cross-sectional view of the spring strip shown in Fig. 3.

Another embodiment is shown in a side view in Fig. 3 and in a cross-sectional view in Fig. 4. Here the metal ring 9, constituting a resilient roller contact race, is held in outside annular claws 8. It is seen that the additional energy storing means, consisting of the coil springs 10, which may be of rubber, are not necessary on principle. They are necessary only if the cross section of the contact strips 9, while being entirely sufficient for conducting the current, is too small to provide for the elastic properties to the desired degree. In this case it is possible to enhance the elastic properties to any desired value by the coil spring 10, which may be replaced or supplemented by plate springs or springs of other shape.

Figure 5:
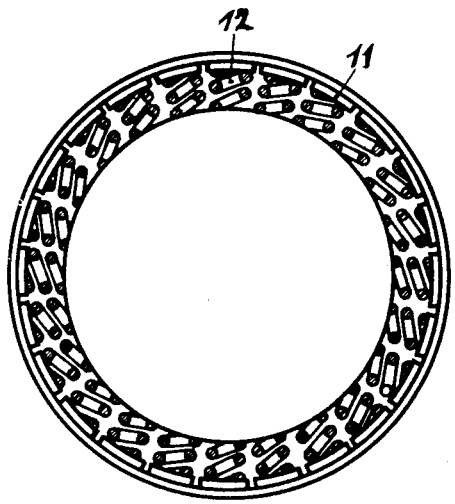
Fig. 5 is a side elevation of a spring strip divided into sections, with one additional energy storing means for each section.

It is not necessary, of course, to form the contact piece as a closed integral annular metal strip. The metal ring may be divided into several sections 11, which also engage with claws, as shown in Fig. 5. In this case it is obvious that the special energy storing means 12 are necessary to provide for the necessary elastic behaviour of the ring sections.

Fig. 6 shows an embodiment in which the resilient metal ring is of multipartite, in particular bipartite construction. The two parts 14 are clamped firmly by means of the claws 13 and corresponding annular abutments. Fig. 6 shows the arrangement of the spring strips one beside the other in the direction of the axis of rotation. It may be suitable to have the spring strips intermesh, as shown in Fig. 7 at 15 and 16, where the two rings intermesh like fingers.

In all these arrangements it is desirable that the contact making surfaces, consisting of the inherently yieldable contact race and the countercontact, should make a linear contact, if possible. Where this cannot be accomplished without difficulty, a multipartite construction may be used to provide for a sufficiently large number of separate contact points, arranged in a line, to ensure an adequate passage of current.

Where elastic parts of sufficient mechanical strength are provided, the cross section of inherently yieldable contact pieces of a roller electrode may be dimensioned only in view of the current to be conducted therethrough. Moreover, it is possible to construct inherently elastic contact races or parts of contact races in two or more layers. In this construction one layer provides for sufficient mechanical strength and elasticity, whereas the other layers are determined and selected with a view to most favourable contact conditions.

The contact arrangements described are to be used as converters for the most various purposes. Half-wave rectification is accomplished, e. g., by the arrangement of two roller electrodes as shown in Fig. 8, one of which (17) is provided with a yieldable contact race 18 constructed according to the invention. The construction of the part 18 of the contact race may be in accordance with any of Figs. 1 to 7. The counterelectrode continuously rolling on the contact race 18 may have a rigid contact race but it is possible just as well to give also the counterelectrode an elastic contact race 18. In the embodiment shown by way of example the contact race of the counterelectrode is rigid. The part 19 of the periphery of the counterelectrode is electrically conductive whereas the part 20 consists of insulating material. The electric current is supplied and conducted away by brushes 21 and slip rings 22, respectively. The peripheral length and the number of conductive and nonconductive parts depend on the frequency used and the speed chosen. In the embodiment shown by way of example, with 50 cycles per second and 3000 rotations per minute, one half 19 would have to be conductive and the other half 20 of the counterelectrode would have to be of insulating material. For 1500 rotations per minute two diametrically opposite quarters of the periphery would be conductive and the other two diametrically opposite quarters would be non-conductive. Based on the same principle the transformation of polyphase currents is possible. E. g., for three-phase rectification an inherently elastic roller electrode conductive all over its periphery is used which is in contact with three roller electrodes conductive only at part of their peripheries. In all these arrangements the peripheral length of the pieces of insulating material will be of the same order of magnitude as the length of the contact-making surface.

What I claim is:

1. In a mechanical rolling contact converter, the combination of a rotatably mounted electrode and counterelectrode, both said electrodes being circular in cross-section, and said counterelectrode having at least one contact surface with insulation adjoining the ends of such surface, said electrodes being in rolling contact with each other and at least one of them being adapted to be driven in a constant direction to make and break the circuit of an alternating electric current in synchronism with the frequency of such current, a contact race on the said electrode, said contact race being of inherently elastic and bodily deformable construction and being additionally elastically supported on its electrode, whereby said elastic contact race during the rolling operation yieldingly hugs the contact surface of said counterelectrode, the peripheral extent of the insulation on the counterelectrode surface being such that the elastic contact race at no time bridges an insulating area on the counterelectrode to make contact simultaneously with the contact surfaces bordering such insulating area.

2. In a mechanical rolling contact converter, the combination of a rotatably mounted electrode and counterelectrode, both said electrodes being circular in cross-section, and said counterelectrode having at least one contact surface with insulation adjoining the ends of such surface, said electrodes being in rolling contact with each other and at least one of them being adapted to be driven in a constant direction to make and break the circuit of an alternating electric current in synchronism with the frequency of such current, a contact race on the said electrode, said contact race being of inherently elastic and bodily deformable construction and being additionally elastically supported on its electrode, whereby said elastic contact race during the rolling operation yieldingly hugs the contact surface of said counterelectrode, the peripheral extent of the insulation on the counterelectrode surface being such that the elastic contact race at no time bridges an insulating area on the counterelectrode to make contact simultaneously with the contact surfaces bordering such insulating area, the elastic support for the elastic contact race comprising energy storing means between said contact race and the body of the electrode carrying the same, said energy storing means acting uniformly against the inner face of the elastic contact race for at least the greater part of the circumference of such race.

3. A mechanical rolling contact converter, as defined in claim 1, wherein the elastic contact race comprises a relatively thin conducting strip clamped on one side thereof to the body of the electrode.

4. A mechanical rolling contact converter, as defined in claim 1, wherein the elastic contact race comprises a relatively thin conducting strip clamped on the two opposite sides thereof to the body of the electrode.

5. A mechanical rolling contact converter, as defined in claim 1, wherein the elastic contact strip has the cross-sectional shape of a bail, the edges of said bail being clamped to the body of the electrode.

6. A mechanical rolling contact converter, as defined in claim 2, including stops on the electrode carrying the elastic contact race, said stops acting to retain the contact race in position against the action of the energy storing means.

7. A mechanical rolling contact converter according to claim 2, wherein the energy storing means consists of rubber springs.

8. A mechanical rolling contact converter as defined in claim 2, wherein the elastic contact race is composed of two parts arranged side by side in the axial direction, the adjoining faces of said parts being of approximately sinuous form and intermeshing with each other.

9. A mechanical rolling contact converter, as defined in claim 2, wherein the elastic contact race consists of layers of at least two different materials.

10. A mechanical rolling contact converter, as defined in claim 2, wherein the contact on the counterelectrode consists of the section of a ring, said counterelectrode having solid insulating material complementing the contact to form a solid roll.

11. A mechanical rolling contact converter as defined in claim 10, wherein the peripheral length of the contact piece on the counterelectrode is of the same order as the peripheral length of the solid insulating material.

12. A mechanical rolling contact converter, as defined in claim 2, wherein the resilient contact race consists of a series of contact pieces of similar construction.

13. A mechanical rolling contact converter, as defined in claim 2, wherein the electrodes are secured to rigidly mounted shafts, whereby deviations in the surfaces of the electrodes from the truly circular form are compensated by the deformation of the elastic electrode race.

14. A mechanical rolling contact converter, as defined in claim 2, wherein the electrodes are secured to shafts of which one is adjustable relative to the axis of the other shaft.

15. A mechanical rolling contact converter, as defined in claim 2, wherein the energy storing means comprises a series of closely spaced helical springs supported on the electrode and bearing against the underside of the elastic contact race, the total of the peripheral extents of contact between the springs and the underside of the elastic contact race constituting the greater part of the peripheral length of such contact race, whereby said race is subjected to a substantially uniform pressure over approximately the whole of its peripheral length.

16. A rotary electrode suitable for use in rotary contact converters, comprising a rotatable carrier, a contact race made of relatively thin, electrically conducting material and capable of being elastically and bodily deformed under impact, and means for elastically supporting said race on the carrier, and comprising a series of closely-spaced helical springs supported on the carrier and bearing against the underside of the contact race, the total of the peripheral extents of contact between the springs and the underside of the elastic contact race constituting the greater part of the peripheral length of such contact race, whereby said race is subjected to a substantially uniform pressure over approximately the whole of its peripheral length.

References Cited in the file of this patent

UNITED STATES PATENTS

| | | |
|---|---|---|
| 1,197,537 | Parker | Sept. 5, 1916 |
| 2,318,503 | Leischner | May 4, 1943 |
| 2,706,233 | Yamaguchi | Apr. 12, 1955 |

FOREIGN PATENTS

| | | |
|---|---|---|
| 125,551 | Sweden | Apr. 19, 1943 |
| 142,578 | Great Britain | May 13, 1920 |
| 217,142 | Switzerland | Sept. 30, 1941 |
| 500,695 | Canada | Mar. 16, 1954 |
| 599,780 | Great Britain | Mar. 19, 1948 |
| 605,385 | France | May 25, 1926 |
| 668,278 | France | Oct. 30, 1929 |
| 903,836 | France | Oct. 18, 1945 |